BUFFER STORAGE SYSTEM

Filed Dec. 27, 1965

3 Sheets-Sheet 1

INVENTORS.
FRANKLIN LEE
BERTRAM L. COURLANG

BY Fred Jacob
ATTORNEY

BUFFER STORAGE SYSTEM

Filed Dec. 27, 1965 3 Sheets-Sheet 2

INVENTORS:
*FRANKLIN LEE*
*BERTRAM L. COURLANG*

BY Fred Jacob
ATTORNEY

Nov. 12, 1968 F. LEE ET AL 3,411,142

BUFFER STORAGE SYSTEM

Filed Dec. 27, 1965 3 Sheets-Sheet 3

INVENTORS.
FRANKLIN LEE
BERTRAM L. COURLANG

BY Fred Jacob
ATTORNEY

United States Patent Office 3,411,142
Patented Nov. 12, 1968

3,411,142
BUFFER STORAGE SYSTEM
Franklin Lee, Acton, and Bertram L. Courlang, Sharon, Mass., assignors to Honeywell Inc., Minneapolis, Minn., a corporation of Delaware
Filed Dec. 27, 1965, Ser. No. 516,501
8 Claims. (Cl. 340—172.5)

ABSTRACT OF THE DISCLOSURE

Variable length blocks of information characters received from an external source stored by recirculation in a single delay line buffer during alternately occurring predetermined periods of time defined by a timing source. During different alternately occurring periods of time, the characters of a previously stored block of information are read out to an output device in a manner whereby the readout of such characters proceeds simultaneously with the storage of newly received characters.

Figure 1:
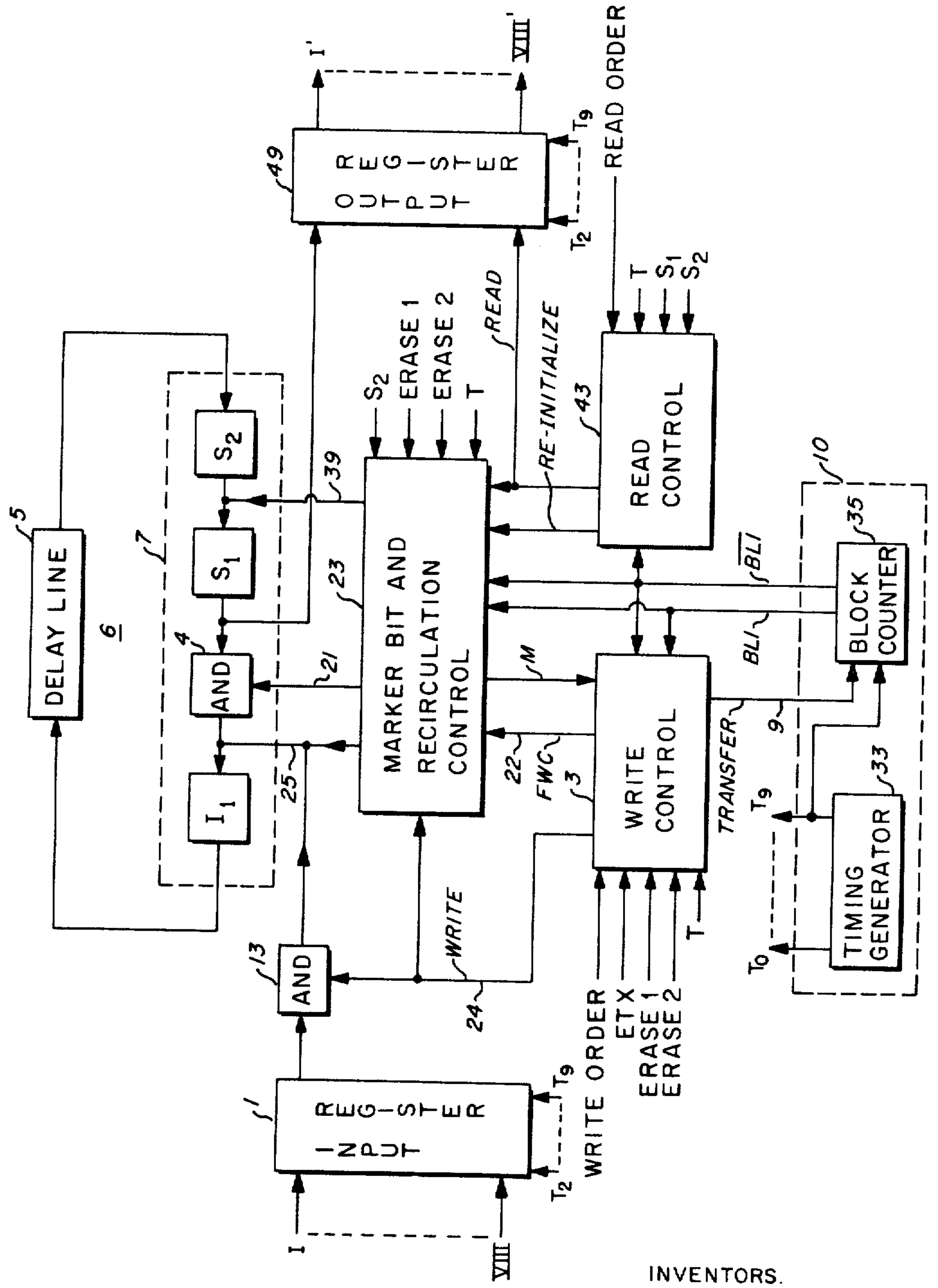

The present invention relates in general to new and improved data processing apparatus and in particular to dynamic data storage apparatus.

Computers customarily employ buffer storage systems between devices which have different data acceptance rates. When the input data of the buffer is derived from a so-called real time system where it is developed as a particular action occurs, it is important that the buffer be capable of receiving information whenever the latter becomes available. This property is referred to as "immediate write access" and is necessary if all the information developed is to be preserved. To this end, so-called double buffer arrangements are widely used and employ a first buffer which receives input information from one or more input information sources, e.g. from the central processor of a computer. The second buffer supplies previously received information to an output device. The latter may, for example, comprise terminal equipment appended to the computer. In this manner it is possible to operate in real time, i.e. to receive the input information as the latter is developed.

In the past, delay lines have been advantageously employed in buffer storage systems by storing information dynamically through recirculation. Assuming that the recirculation path of a single delay line has substantially no delay, the delay time $\Delta t$ will be the time interval elapsed between the application of the pulse at the input of the delay line and the time such pulse is received at the output.

Let it be assumed that two blocks of information derived from a real time input, as defined above, are to be stored in sequence in a single delay line having an associated recirculation path. The first block to arrive may be written into the delay line immediately. The second block, which may possibly not follow the first block immediately, can be written into the delay line only if the recirculating first block is so positioned at the time that it will not interfere with the writing of the second block. Since the arrival of the second block cannot be accurately predicted when it is derived from a real time input, immediate write access, i.e. the immediate writing in of the second block into the delay line may be precluded. The problem is further compounded where the length of the information blocks is variable, a condition not uncommon in real time systems.

In an attempt to overcome these difficulties, prior art buffer systems for storing relatively large amounts of data have employed at least a pair of delay lines. In one arrangement, the delay lines may be connected in series to provide a single recirculation path by joining the output of one to the input of the other. In another arrangement they may be connected in parallel with each delay line having an individual recirculation path. Neither arrangement has proven to be entirely satisfactory. In the series-connected circuit, the problems encountered are essentially those of a single delay line buffer, the major difference being that additional storage capacity is provided. Among the attendant disadvantages is the duplication of the delay lines and the relatively complex logic circuitry required to keep track of the timing and to take into account the information blocks of variable length. In the second arrangement, special access selection circuitry must be provided, which tends to be complex and which increases the cost of such a buffer system. In addition to such relatively complex circuitry, there is also a duplication of the delay lines, of the input transducers and input circuitry, of the control circuitry and of the output circuitry.

Accordingly, it is the primary object of the present invention to provide a new and improved buffer storage system which is not subject to the foregoing disadvantages.

It is a further object of the present invention to provide a simple and inexpensive buffer storage system wherein a single delay line is employed for independently storing a plurality of information blocks.

It is another object of the present invention to provide a buffer storage system employing a single delay line which is readily capable of storing information blocks of varying length.

It is still a further object of the present invention to provide a multiple buffer storage system employing a single delay line which is capable of storing information blocks of varying length.

It is still a further object of the present invention to provide a buffer storage system employing a single delay line which is capable of providing substantially immediate write access for each one of a plurality of successively received information blocks.

It is yet another object of the present invention to provide a simple and inexpensive double buffer storage system employing a single delay line which is capable of providing immediate write access for a pair of information blocks of variable length.

The present invention provides a novel and relatively simple buffer arrangement which is operative to permit the storage of a plurality of information blocks independently of each other within a single delay line. The arrangement is such that substantially immediate write access is provided for newly arriving information blocks, independently of the length of the latter. More specifically, the invention comprises a single delay line connected in a recirculation loop and associated control logic operative for asynchronously writing into the delay line at pre-designated character time intervals information characters belonging to information blocks of variable length.

In accordance with a preferred embodiment of the present invention, a pair of blocks is stored in a single delay line, each consisting of a variable plurality of serially arranged data characters. First and second alternately occurring signals are provided which are operative to define corresponding first and second alternately occurring time intervals of equal duration. In the subject invention, the recirculation time of the delay line and its associated recirculation path is a multiple of the number of different time intervals, as defined above. In the arrangement under discussion, the recirculation time is therefore a multiple of two, there being first and second different time intervals. Thus, as long as the aforesaid conditions prevail, the recirculating information characters retain a constant relationship with respect to the above-defined time intervals, independent of the total number of recirculations.

In the subject invention, characters belonging to either the first or the second block are written into the delay line only during the occurrence of the aforesaid firt signals, i.e. during the above-defined first time intervals. The readout of the aforesaid information characters occurs only during the occurrence of second signals, i.e. during second time intervals. Thus, if the characters of the first block are written into the delay line during the aforesaid first time intervals, alternate segments of the delay line, at any instant, will contain the recirculating information.

In order for the characters of the second block to be written into the unfilled segments of the delay line, upon the completion of writing all first block characters, the timing source is inhibited so as to reverse the occurrence of the aforesaid first and second signals. The occurrence of the first and second character time intervals is thus reversed relative to absolute time. In an arrangement having a recirculation time as defined above, the block 1 characters following the aforesaid reversal will appear at the output of the delay line only during second character time intervals. This action permits the readout of the characters in block 1 during the same general time period during which the block 2 characters are being written into the delay line.

The invention thus provides a true double buffering function which permits the concurrent writing and readout of characters belonging to different information blocks. Such an arrangement is capable of operating on information blocks of variable length, provided only that the delay line is long enough to store the characters of both blocks. Immediate write access is preserved at all times.

Figures 2, 2A, 2B, 2C, 2D, 2E, 2F:
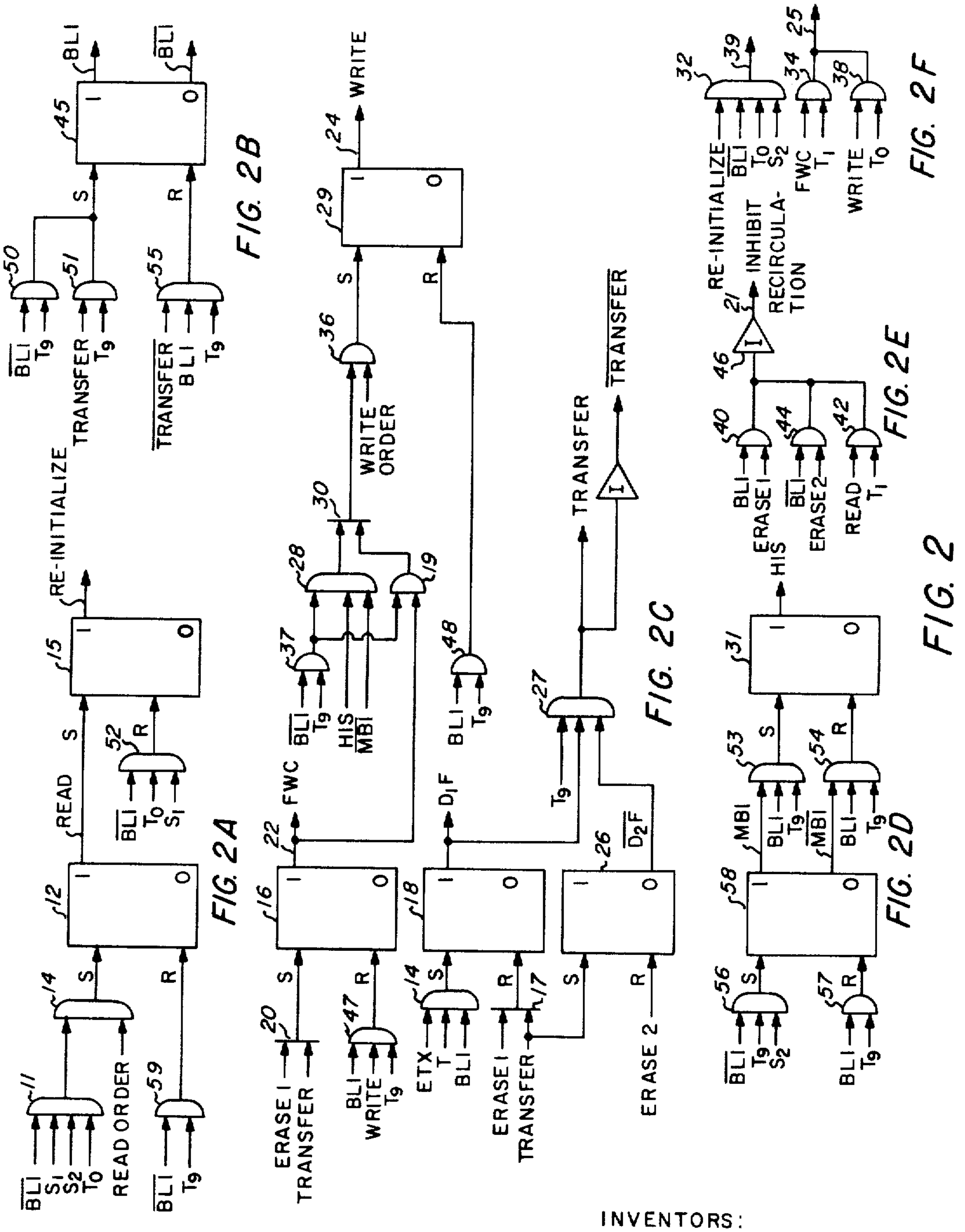
Figure 3:
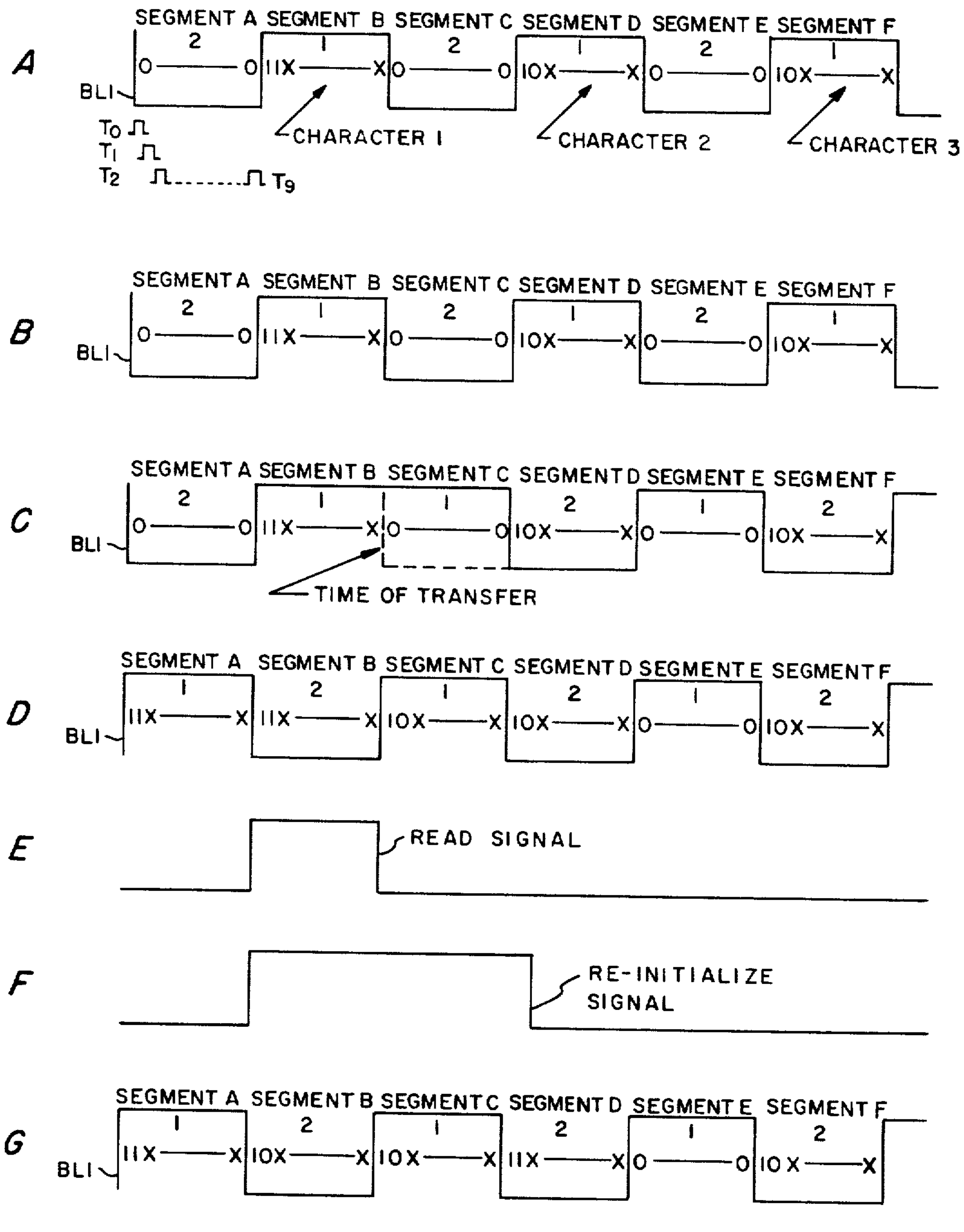

The foregoing objects and features of the present invention, together with further features and advantages thereof will become apparent from the following detailed specification with reference to the accompanying drawings in which:

FIGURE 1 is a block diagram of a preferred embodiment of the invention;

FIGURE 2 consists of FIGURES 2A, 2B, 2C, 2D, 2E and 2F which illustrate in greater detail pertinent features of the apparatus of FIGURE 1; and FIGURE 3 consists of separate timing lines indicated as A, B, C, D, E, F and G which diagrammatically illustrate pertinent time relationships.

With reference now to the drawings, FIGURE 1 illustrates a closed path 6 for recirculating information, wherein a delay line 5 has its output coupled to an external bit storage unit 7. The latter unit comprises a sampling flip-flop $S_2$ having its input connected to the output of the aforesaid delay line 5. The flip-flop $S_2$ has its output connected to a further sampling flip-flop $S_1$ whose output, in turn, is connected to an AND gate 4. The gate 4 receives a further input 21 from a marker bit and recirculation control unit 23, the gate output being coupled to the input of a synchronizing flip-flop $I_1$. The output of the unit 7 is derived from the aforesaid flip-flop $I_1$ and is coupled to the input of the delay line 5.

The unit 23 receives as inputs a signal derived from the sampling flip-flop $S_2$, as well as a pair of signals designated Erase 1 and Erase 2. A pair of inputs 22 and 24 supplies signals designated FWC and Write respectively, to the unit 23 from a write control unit 3. A timing source 10 includes a timing generator 33 adapted to furnish timing pulses $T_0$ to $T_9$ of predetermined duration. The latter timing pulse constitutes one input of a block counter 35 which provides a pair of complementary output signals BL1 and $\overline{BL1}$ which are coupled as additional inputs to the unit 23. Similarly, the timing pulses constitute an additional input of the unit 23 where they are designated as T. The unit 23 includes outputs 25 and 39 which are connected to the inputs of the synchronizing flip-flop $I_1$ and of sampling flip-flop $S_1$ respectively. A further output of the unit 23 is designated M and is coupled to the write control unit 3.

In the preferred embodiment of the invention which is illustrated in FIGURE 1, externally derived input information is applied in parallel on a set of lines I to VIII to an input register 1. The latter register additionally receives timing pulses $T_2$ to $T_9$ and has an output which is coupled to one input of a write AND gate 13, the output 24 of the unit 3 constituting a further gate input. The output of the gate 13 is coupled to the input of the flip-flop $I_1$.

The write control 3 receives a pair of externally derived control signals designated Write Order and ETX respectively. The Write Order signal is representative of the fact that a transfer to the input register 1 of the aforesaid externally derived information has been effected. The signal ETX is indicative of the fact that the transfer of a block of the aforesaid externally derived information to the register 1 has been completed, as will be explained hereinbelow in greater detail. The above-mentioned signals, T, Erase 1 and Erase 2, as well as the signals BL1 and $\overline{BL1}$, constitute additional inputs of the write control unit 3. An output 9 of the unit 3 supplies a Transfer signal as an additional input of the block counter 35.

A read control unit 43 receives the above-discussed signals T and $\overline{BL1}$ as inputs. Signals derived from the sampling flip-flops $S_1$ and $S_2$ respectively form additional inputs of the unit 43. A further input is designated Read Order and may be derived from a suitable output device, e.g. from terminal equipment associated with a computer to indicate that such equipment is ready to receive information from the apparatus of FIGURE 1. A pair of outputs, connected to the unit 23 and to an output register 49, is adapted to apply signals designated Re-initialize and Read respectively to these units. The output register 49 further has a single line input connected to the output of the sampling flip-flop $S_1$ and is further connected to receive the aforesaid timing pulses $T_2$ to $T_9$. Information from the register 49 is derived on a set of output lines I′ to VIII′ for further transfer to subsequently connected utilization devices such as the terminal equipment mentioned above.

FIGURES 2A–2F are logical circuit diagrams illustrating in greater detail the preferred embodiment of the invention shown in FIGURE 1, applicable reference numerals having been retained. FIGURE 2A illustrates a preferred implementation of the read control unit 43 of FIGURE 1. Signals $\overline{BL1}$ $S_1$, $S_2$ and $T_0$ are connected as inputs to an AND gate 11 which has its output connected to the input of an AND gate 14. The Read Order signal is also connected as an input to gate 14 whose output is connected to the set input of a flip-flop 12. Signals $\overline{BL1}$ and $T_9$ constitute inputs of an AND gate 59 whose output is connected to the reset input of flip-flop 12. The aforesaid Read signal which is derived at the assertive output of flip-flop 12, is applied to the set input of a flip-flop 15. The Re-initialize signal is derived at the assertive output of the flip-flop 15. Signals $\overline{BL1}$, $T_0$ and $S_1$ are applied as inputs to an AND gate 52, whose output is connected to the reset input of the flip-flop 15.

FIGURE 2B illustrates in greater detail the block counter 35 of FIGURE 1. The block counter is shown to comprise a single flip-flop 45 whose assertive output is connected as an input to an AND gate 55 whose output, in turn, is connected to the reset input of flip-flop 45. Additional input signals $\overline{\text{Transfer}}$ and $T_9$ are applied to the input of the gate 55. The negative output of flip-flop 45 is connected to the input of an AND gate 50, having as a further input the signal $T_9$. The output of this latter gate is connected to the set side of flip-flop 45, as is the output of an additional gate 51 having as its inputs the signals $T_9$ and Transfer. In this arrangement flip-flop 45 is adapted to complement, that is, change state upon each occurrence of timing pulse $T_9$ during the absence of a Transfer signal, i.e. when the $\overline{\text{Transfer}}$ signal is active.

The presence of a Transfer signal inhibits or prevents the complementing since the $\overline{\text{Transfer}}$ signal is inactive and gate 55 remains non-conductive. Thus, the flip-flop 45 remains in the set condition during the subsequent occurrence of timing pulse $T_9$.

FIGURE 2C shows in greater detail the logic circuitry of write control unit 3. Erase 1 and Transfer signals are seen to be applied as inputs to an OR gate 20 whose output is connected to the set side of a flip-flop 16. Signals Write, BL1 and $T_9$ are connected as inputs to an AND gate 47 whose output is connected to the reset side of the aforementioned flip-flop. The assertive output of the latter, appearing on line 22 and designated as signal FWC, is connected as an input to an AND gate 19 which receives a further input from the output of an AND gate 37. Signals $\overline{\text{BL1}}$ and $T_9$ are connected as inputs to AND gate 37 whose output is connected to an AND gate 28. The latter receives as additional inputs signals designated as HIS and $\overline{\text{MBI}}$. The output of AND gate 28 is connected to the input of an AND gate 36 via an OR gate 30, the latter being further connected to the output of gate 19. Gate 36 has the Write Order signal connected as an input, its output being connected to the set input of a flip-flop 29. The assertive signal output of the latter appears on line 24 and constitutes the aforesaid Write signal. Signals BL1 and $T_9$ are connected as inputs to an AND gate 48 whose output is connected to the reset input of the aforementioned flip-flop 29.

The logic circuitry necessary to generate the signals Transfer and $\overline{\text{Transfer}}$ comprises a pair of flip-flops 18, 26 as well as an AND gate 27. Signals ETX, T and BL1 are connected as inputs to an AND gate 14, whose output is connected to the set input of flip-flop 18. The assertive output signal of the latter is designated $D_1F$ and is applied as an input to an AND gate 27. Signals Erase 1 and Transfer are connected as inputs to an OR gate 17 whose output is connected to reset input of flip-flop 18. The Transfer signal is further applied to the set input of flip-flop 26 while the reset input of the latter receives the Erase 2 signal. The negative output signal of flip-flop 26 is designated $\overline{D_2F}$ and is applied, together with the signal $T_9$ to the input of gate 27. The Transfer signal is derived at the output of gate 27, such signal being inverted in order to obtain the $\overline{\text{Transfer}}$ signal.

FIGURES 2D, 2E and 2F, together illustrate in greater detail the marker bit and recirculation control unit 23 of FIGURE 1. In FIGURE 2D, signals $\overline{\text{BL1}}$, $T_9$ and $S_2$ are seen to be applied to the input of an AND gate 56 whose output is connected to the set input of a flip-flop 58. Signals BL1 and $T_9$ are connected as inputs to an AND gate 57 whose output is connected to the reset input of the aforementioned flip-flop. The assertive output of flip-flop 58 is connected to the input of an AND gate 53, the latter further receiving input signals BL1 and $T_9$. The output of gate 53 is connected to the set input of a flip-flop 31. The negative output signal of flip-flop 58 is designated as signal $\overline{\text{MBI}}$ and is applied as an input to an AND gate 54. The latter further receives signals BL1 and $T_9$ as inputs. The output of gate 54 is connected to the reset input of flip-flop 31 whose assertive output signal is designated as HIS.

FIGURE 2E illustrates logical circuitry for generating an Inhibit Recirculation signal on line 21 which constitutes one output of unit 23 in FIGURE 1. Signals BL1 and Erase 1 are connected as inputs to an AND gate 40 which has its output connected to an inverter stage 46. Similarly, the output of an AND gate 44, having as its inputs signals $\overline{\text{BL1}}$ and Erase 2, is connected to the inverter 46. The output of an AND gate 42, having as inputs the signals Read and $T_1$ is also connected to the input of inverter stage 46, the Inhibit Recirculation signal being derived at the output of the latter.

FIGURE 2F illustrates logic circuitry for generating internal marker bits on line 25 as an output of the unit 23, as explained in greater detail hereinbelow. Additionally, the output signal generated on line 39 provides the modification of the second of these two marker bits. From an examination of FIGURE 2F, it is seen that signals Write and $T_0$ are connected as inputs to an AND gate 38 which, when activated produces an output on line 25 to generate a binary "1" as the first marker bit. Signals FWC and $T_1$ are connected as inputs to AND gate 34 which upon being activated, causes a binary "1" to be written as the second marker bit. An AND gate 32, having input signals Re-initialize, $\overline{\text{BL1}}$, $T_0$ and $S_2$ is operative to produce an output signal on line 39 to modify an existing marker bit format.

The operation of the apparatus of FIGURES 1 and 2 will best be understood with the aid of the timing diagrams shown in FIGURE 3. As previously explained, in a preferred embodiment of the invention the delay line 5 is capable of dynamically storing first an dsecond information blocks by recirculation via external bit storage unit 7, each block consisting of a variable plurality of serially arranged data characters. In a preferred embodiment of the invention, each data character in the delay line is defined by ten serial binary digits or bits, there being eight externally derived data bits and two internally generated marker bits. Typical contents of a portion of the delay line, as viewed at a given instant in time, are shown in FIGURE 3A, the respective marker bits being illustrated by "0's," "1's," while X's represent the data bits which may consist of "1's" or "0's." The delay line may be considered as being divided into segments A, B, C . . . etc., at any one instant of time. Each segment may contain a 10-bit character that constantly propagates down the delay line while maintaining the illustrated relationship to the other stored characters. In other words, the respective delay line segments may be considered as recirculating around the closed path 6 while maintaining the positional relationship shown in FIGURE 3A.

The timing generator 33 of the timing source 10 provides the timing pulses $T_0$ to $T_9$ at its output, the pulse $T_9$ being applied to the block counter 35. The latter unit, which is shown in FIGURE 2B, is thus complemented each time the timing pulse $T_9$ appears. The signal appearing at the output of the flip-flop 45 is designated BL1 and is illustrated in FIGURE 3A as a sequence of positive pulses which define the aforesaid first character intervals. The pulse spacing defines the aforesaid second character intervals which are of identical duration to the first character intervals. The different intervals are appropriately identified in FIGURE 3A. Each character interval is seen to span ten bits, i.e. one character. It will be clear that the waveform $\overline{\text{BL1}}$ is the inverse of the BL1 waveform shown in FIGURE 3A. It has therefore been omitted from the drawings for the sake of simplicity. FIGURE 3A further illustrates the time relationship of the timing pulses $T_0$ to $T_9$ and an exemplary character interval. The timing pulses each have a predetermined duration and are seen to divide the character interval into ten equal portions.

Let it be assumed that the first externally derived 8-bit character of the first information block, i.e. block 1, has been transferred to the input register 1. This fact is indicated by the Write Order signal of FIGURE 1 which is recognized by the write control unit 3. Let it be further assumed that the delay line has been cleared of data previously stored therein by the application of externally derived signals Erase 1 and Erase 2 to the unit 23. Thus, the contents of each delay line segment can be represented entirely by binary "0's," e.g. as shown in segment A in FIGURE 3A. At the termination of timing pulse $T_9$, as shown with respect to segment A, the Write signal on line 24 becomes active. Upon the occurrence of the next timing pulse $T_0$, the unit 23 energizes the line 25 to set the synchronizing flip-flop $I_1$ which, in turn, writes a binary "1" into the first bit position of the delay line segment B. In the present embodiment of the invention, the presence of a binary "1" in the first bit position of a delay line segment indicates the presence of a stored data character in the segment.

Upon the occurrence of the next timing pulse $T_1$, unit 23 activates the line 25 and a binary "1" is written into the second bit position of segment B by way of the flip-flop $I_1$. The presence of a binary "1" in the second bit position of a delay line segment containing a character of an information block denotes the first character of said block.

The subsequently occurring timing pulses $T_2$ to $T_9$ successively cause the eight data bits stored in the register 1 to be written into delay line segment B by way of gate 13 and flip-flop $I_1$. As previously observed, the data bits may be either binary "1's" or "0's", but they are represented by X's in the drawings for the sake of clarity. Upon the termination of the timing pulse $T_9$, which is effective to write the last data bit into the delay line segment B, the Write signal applied to the line 24 becomes inactive and remains in this condition for the next character interval which coincides with segment C in FIGURE 3A. More specifically, no data bits are written into segment C at this point in the operation of the apparatus so that this segment will continue to hold only binary "0's" as shown.

The step of clearing the delay line of its previous contents and of storing the first character of block 1, as discussed above with reference to the apparatus at FIGURE 1, will now be described in greater detail with reference to FIGURE 2. The generation of the Inhibit Recirculation signal on line 21 which is effective to clear the delay line 5 of its previous contents, is illustrated in the circuit shown in FIGURE 2E. The signals Erase 1 and Erase 2 are applied to the AND gates 40 and 44 respectively, said gates becoming active upon the occurrence of the signals BL1 and $\overline{BL1}$ respectively. When the gates 40 and 44 become conductive during alternate character time intervals, the resultant output signals are applied to the inverter 46 and subsequently, by way of the line 21, to the AND gate 4. The latter becomes nonconductive during the application of the Erase signals to inhibit the recirculation or rewriting of the data characters into delay line 5.

The generation of the Write signal on line 24, which enables the gate 13 to effect the storage of data, is explained here with reference to FIGURE 2C. The occurrence of the signal Erase 1 at the input of the OR gate 20 causes the flip-flop 16 to be set and causes a corresponding signal, designated FWC, to appear at the output line 22. The latter signal is applied to one input of gate 19. The other input of the gate 19, being coupled to the output of gate 37, becomes active upon the coincidence of the signals $\overline{BL1}$ and $T_9$. This marks the beginning of each first character interval, each indicated by the numeral 1 in FIGURE 3A. The resultant output signal of gate 19 is coupled to one input of the AND gate 36, by way of the OR gate 30. The gate 36, which receives the previously discussed Write Order signal at another input thereof, thus becomes active to set the flip-flop 29 and hence to generate the Write signal at the output 24 of the latter. The end of the character time interval under discussion is defined by the coincidence of the signals BL1 and $T_9$ which render the gates 47 and 48 respectively, active to reset the flip-flops 16 and 29 respectively.

As previously explained, the characters constituting a given block are written into alternate segments of the delay line. Thus, the characters of block 1 will be written only into the segments B, D, F etc., the segments C, E etc., being reserved for the characters of the second block. While the characters of block 1 may arrive at lines I to VIII at a rate sufficiently rapid to be written into segments D, F, etc., as the segments become available for writing, it is here assumed that the input information rate is sufficiently slow to permit the stored character (the first character of block 1) to recirculate at least once around the closed path 6. Thus, under the assumed operating conditions, the second character of block 1 resides in the input register 1, such condition being indicated by a Write Order signal.

The timing of the recirculating information is such that, the first marker bit of a character resides in the sampling flip-flop $S_2$ only during the occurrence of a timing pulse $T_9$ and during the occurrence of the subsequent timing pulse $T_0$ of the following character interval, the same marker bit resides in the flip-flop $S_1$. From a consideration of FIGURE 3A, it will be apparent that the first marker bit of character 1 of the first information block will, therefore, reside in the flip-flop $S_2$ during a time period defined by the pulse $T_9$ preceding the first character interval denoted by segment B. This marker bit is thus recognized and transferred to the unit 23 where it is stored.

The contents of the first marker bit position of the second character of block 1, which is to be stored in segment D of the delay line, are sampled at time $T_9$ during the succeeding first character interval and are transferred to the unit 23. Inasmuch as segment D is as yet unfilled, a binary "0" will be recognized for this bit position. During the occurrence of the latter timing pulse $T_9$, a comparison of the two sampled marker bits takes place in the write control unit 3 to which the marker bits have been transferred by way of the line M. If, as in the case in the example under consideration, the two successively sampled bits are not identical and occur in the sequence binary "1" and binary "0," a Write signal is generated at the termination of timing pulse $T_9$ and is applied to the unit 23 by way of line 24. A marker bit is now generated in the manner previously explained with reference to FIGURE 2F, and is written into the delay line 5 by way of the synchronizing flip-flop $I_1$. The generation of the Write signal conditions AND gate 13 to admit the eight data bits of the second character which are stored in the register 1. The latter are successively written into the delay line by way of the synchronizing flip-flop $I_1$ upon the occurrence of the timing pulses $T_2$ to $T_9$, in the same manner as previously explained in connection with the writing of the first character.

The pertinent portions of the marker bit and recirculation control unit 23 for carrying out the aforesaid operation are shown in detail in FIGURE 2D. The binary "1" contents of the first bit position, i.e. the first marker bit of character 1 in FIGURE 3A, is stored in flip-flop 58 as it is being recirculated around the closed path 6. This is accomplished by transferring the contents of flip-flop $S_2$ via gate 56, during the occurrence of timing pulse $T_9$ in segment A, as defined by the signal $\overline{BL1}$. This action causes the signal MB1 at the output of flip-flop 58 to become active. The contents of flip-flop 58 are transferred via gate 53 one character interval later, i.e. upon the concurrence of signals BL1 and $T_9$, and are stored in flip-flop 31. The latter thus provides a responsive output signal HIS. Concurrently, with the transfer of the contents of flip-flop 58 to flip-flop 31, the former is reset upon the activation of gate 57 by the aforementioned signal BL1 and timing pulse $T_9$. Upon the subsequent occurrence of timing pulse $T_9$ and signal $\overline{BL1}$ one character interval later, the contents of the first marker bit position of segment D are transferred from $S_2$ to flip-flop 58. Since no data character is stored in segment D at this time, the contents of the first marker bit portion are binary "0." Accordingly, the flip-flop 58 remains reset and the signal $\overline{MB1}$ is active. Thus, flip-flops 31 and 58 now contain the contents of the first marker bit positions of segments B and D.

The recognition that segment D is the particular segment into which character 2 of the first information block is to be written, is effected by comparison logic circuitry shown in FIGURE 2C. The signals HIS and $\overline{MB1}$ which are representative of a "1" and a "0" stored in the flip-flops 31 and 58 respectively, are compared by being applied to gate 28. The output of gate 37 becomes active upon the concurrence of signals $\overline{BL1}$ and $T_9$. If a "1" to "0" transition has occurred relative to the contents of the first marker bit positions of segments B and D, the output of gate 28 will be active, such signal being coupled to the input of gate 36 by way of OR gate 30. In the presence of a Write Order signal, flip-flop 29 is set and provides the Write signal on line 24. The first marker bit is thus written into segment D as a binary "1," by way of the circuit shown in FIGURE 2F and synchronizing flip-flop $I_1$.

Since signal FWC of FIGURE 2C is no longer applied to the logic circuitry of FIGURE 2F, flip-flop 16 having been reset after the writing of character 1, no signal will be generated on line 25 upon the occurrence of timing pulse $T_1$. Consequently, a binary "0" is written into the second bit position of segment D. Following the aforesaid operation, the eight information bits of the second character are written into the delay line, as explained above. Subsequently arriving characters of the first information block are written into alternate segments of the delay line, i.e. segment F etc.; the first and second marker bits of each of the aforementioned characters being written as a binary "1" and binary "0" respectively.

The above-described writing of characters into alternate segments of the delay line continues until the last character of the first information block has been received and is written into the delay line. The transfer of this character into register 1 is denoted by the application of externally derived signal ETX as an input to write control unit 3 in FIGURE 1. As mentioned previously, the presence of signal ETX is indicative of the fact that the transfer of all the characters of the first information block to the register 1 has been completed. It will be appreciated that the ETX signal may also be internally derived by means of logic circuitry connected to register 1 and responsive to recognize the last character of block 1. The condition of the delay line at this point is illustrated in FIGURE 3B, wherein alternate segments B, D, F, etc. contain the data characters of block 1, while the intermediate segments A, C, E, etc. are seen to be empty.

Upon the subsequent writing of the 8 data bits of the last character into the delay line, a transfer signal is generated by write control unit 3, provided that the segments occurring during second characters intervals do not contain data characters as explained above. The transfer signal is applied to block counter 35 and inhibits the complementing thereof. This action extends the duration of signal BL1 for one additional character time interval, as shown in FIGURE 3C. In effect, this produces a reversal of the occurrence of first and second character time intervals as defined by signal BL1. Since the writing of characters can occur only during first character time intervals, as stated above, the unfilled data line segments A, C, E, etc. now become available for receiving data characters of the second block. This condition will become clear by a comparison of FIGURES 3B and 3C. Segments D and F which coincide with first character time intervals in FIGURE 3B are seen to coincide with second character time intervals in FIGURE 3C, i.e. after the occurrence of the transfer signal. Similarly, segments C and E which coincide with second character time intervals in FIGURE 3B, coincide with first character time intervals following the occurrence of the transfer signal as shown in FIGURE 3C.

It will be apparent from the foregoing explanation that the subject invention permits the writing of characters of the second information block immediately following the writing of the last character of the first block. This action is independent of the length of the first block, i.e. of the number of data characters constituting that block. As mentioned previously, this capability is essential in computer systems wherein the data characters are derived from a real time input such that the buffer must be able to accept information characters as they arrive.

The generation of the above-discussed transfer signal and the resultant reversal of first and second character intervals will become clear with reference to FIGURES 2B and 2C. Since the delay line was initially cleared of data by the application of the signal Erase 1 to flip-flop 18 via OR gate 17, and the application of the signal Erase 2 to the reset input of flip-flop 26, both flip-flops 18 and 26 are initially in a reset state. Signal ETX is applied to the input of AND gate 14 during the occurrence of a subsequent timing pulse T. Concurrently signal BL1, which defines a first character interval, is applied to gate 14. The latter becomes active and sets flip-flop 18, thus generating signal $D_1F$ at its output. The presence of signals $\overline{D_2F}$ due to the reset state of flip-flop 26, concurrently with the signal $D_1F$, causes the AND gate 27 to become active upon the occurrence of timing pulse $T_9$. The signals Transfer and $\overline{\text{Transfer}}$ thus appear at the output of gate 27 and are applied as inputs to gates 51 and 55 of flip-flop 45 respectively to prevent the complementing of flip-flop 45 for one additional character time interval.

Following the generation of the transfer signal, the first character of the next information block, i.e. of the second information block, may be written arbitrarily into any unfilled segment during a second character time interval defined by signal BL1. Subsequent characters of the second information block are similarly written into the delay line during second character time intervals, such action continuing until all block 2 characters have been written. The operation of writing characters of the second block is identical to that explained previously in connection with block 1. As explained in greater detail below, during such writing the characters of block 1, stored in segments B, D, F, etc., of FIGURE 3D may be successively read out during second character time intervals.

As previously explained, the double buffer system which forms the subject matter of the present invention, permits the concurrent writing and readout of information with respect to the delay line 5. If the input information character rate is such that the characters of a given block are written in during alternate character time intervals so that the writing of the entire block is completed within the time required to recirculate, then readout may take place at a corresponding character rate. In the preferred embodiment of the invention, the input rate was assumed to be such that characters are written in at a rate no greater than one character per recirculation period. Accordingly, the readout operation is explained below with reference to a similar character rate.

With reference to FIGURES 1, 3D, E, F and G, the readout of the eight data bits of the first character of the first information block to register 49 will be described. It is assumed that a Read Order signal is present at one input of read control unit 43, indicative of the fact that the associated output device (not shown in FIGURE 1), is ready to receive a data character from output register 49. This is accomplished by sampling the marker bits of each character during the occurrence of timing pulse $T_0$ in each second character time interval, until both marker bit positions of a character are recognized by the unit 43 to contain binary 1's. In the case under consideration, segment B of FIGURE 3D contains first and second marker bits which are both binary "1's." As previously mentioned, the timing of the recirculation of character bits is such that during the occurrence of timing pulse $T_0$, the first and second marker bits reside in the flip-flops $S_1$ and $S_2$ respectively during the occurrence of pulse $T_0$ in the appropriate second character interval. Upon sampling of these flip-flops, a Read signal is generated by read control unit 43, which permits the readout of the eight data bits of the character stored in segment B during the subsequent occurrence of timing pulses $T_2$ to $T_9$. See FIGURE 3E.

The presence of the Read signal further causes the subsequent generation of the Re-initialize signal by read control unit 43, as shown in FIGURE 3F. Both these signals are applied as inputs to marker bit and recirculation control unit 23. The occurrence of the Read signal causes the unit 23, via line 21, to render the gate 4 non-conductive during the occurrence of timing pulse $T_1$. This inhibits the recirculation of the binary "1" contents of the second marker bit position to cause binary "0" to be written into the delay line in place thereof. See FIGURE 3G.

The Read signal applied at the input to register 49 enables the readout into register 49 of the eight data bits of the character stored in segment B, as they appear at the output of flip-flop $S_1$ during the occurrence of timing pulses $T_2$ to $T_9$ of the corresponding second character interval. It will be understood that the aforesaid data bits are read out as well as being recirculated around the closed path. At the end of the last-mentioned second character interval, the Read signal is terminated. The eight data bits of the character stored in segment B now reside in register 49.

From FIGURES 3F and 3E, the Re-initialize signal is seen to persist into the subsequent second character interval, i.e. the interval corresponding to segment D. The occurrence of timing pulse $T_0$ during the last-mentioned character time interval causes the generation of an output signal on line 39 by the aforementioned unit 23. This action is effective to write a binary "1" into the second bit position of segment D by way of synchronizing flip-flop $I_1$. See FIGURE 3G. From a comparison of FIGURES 3D and 3G, it will be observed that the second marker bit of the character stored in segment B is changed from a binary "1" to a binary "0," indicative of the fact that its eight data bits have been read out into register 49. Conversely, the second marker bit of the character stored in segment D has been changed from a binary "0" to a binary "1" to indicate that this is the next character whose eight data bits are to be read into register 49 upon the subsequent generation of another Read Order signal. The Re-initialize signal shown in FIGURE 3F is terminated when the contents of the first marker bit position in Segment D have been recognized as a binary "1."

The readout of the data bits of the character stored in segment B will be now described with reference to the logic circuitry shown in FIGURES 2A, 2E and 2F. The inputs $S_1$ and $S_2$ are sampled at the input of gate 11 upon the occurrence of timing pulse $T_0$, during the second character time interval corresponding to segment B in FIGURE 3D. The latter time interval is defined by a positive $\overline{BLI}$ signal. Flip-flops $S_1$ and $S_2$ at this time contain marker bits 1 and 2 of the character stored in segment B and, since the contents of both are binary "1's," gate 11 is activated. This causes flip-flop 12 to be set by way of gate 14 in the presence of a Read Order signal as discussed above. The occurrence of a Read signal at the output of flip-flop 12 causes flip-flop 15 to be set and to generate the Re-initialize signal at its output. The concurrence of the Read signal and timing pulse $T_1$ cause the activation of gate 42 in FIGURE 2E, resulting in the generation of the Inhibit Recirculation signal on line 21 which disables AND gate 4, as discussed above.

Flip-flop 12 is reset by the activation of AND gate 59 at the end of a second character time interval defined by the positive $\overline{BLI}$ signal and timing pulse $T_9$. See FIGURE 2A. Flip-flop 15 is reset by the presence of signals $\overline{BLI}$ and $S_1$ concurrently with timing pulse $T_0$ at the input of AND gate 52. Concurrently, the binary "1" contents of flip-flop $S_1$, which contains the first marker bit of the character stored in segment D, are transferred to synchronizing flip-flop $I_1$. By the same shift register action the binary "0" contents of $S_2$, which contains the second marker bit of the character stored in segment D, are transferred to flip-flop $S_1$. However, the presence of signals Re-initialize, $\overline{BLI}$ and $S_2$ at the input of AND gate 32 (FIGURE 2F) during the occurrence of timing pulse $T_0$, is operative to generate a signal on line 39, i.e. at the input of $S_1$. This action causes a binary "1" to be transferred into $S_1$ in lieu of the binary "0" from flip-flop $S_2$. Thus, a binary "1" is written into the second marker bit position of the character stored in segment D during the subsequent occurrence of timing pulse $T_1$. Each Re-initialize signal appearing on line 41 of FIGURE 1 will be terminated only when the contents of the first marker bit position of the next encountered character appearing in segments B, D, F, etc. is a binary "1."

Subsequently, the 8 data bits of each of the character stored in segment D of the first information block are read out in a manner similar to that described above. Subsequent characters are similarly read out, i.e. upon receipt of a Read Order signal once per recirculation period. The readout of each character involves the generation of a separate Re-initialize signal which, as explained above, is terminated upon the recognition of the appropriate marker bit of the next character to be read.

Depending upon the length of the information block being read out, the last character read out will be followed by a variable number of unfilled segments. In such case, the Re-initialize signal is maintained following the readout of the last character in the block, until the marker bit position of the recirculated first character of the same block is recognized. Thus, the system is able to ignore segments containing no data characters. In the manner explained above, the second marker bit of the aforesaid last-mentioned first character is changed from "0" to "1." The first information block now has the same format as it did prior to the initiation of readout. In the absence of a further Read Order signal, the marker bits of subsequent first block characters will remain unmodified.

It will be clear that the restoration of the first block to its original format permits this block to be read out again in the event the first readout was unsuccessful, e.g. due to the failure of the terminal equipment to receive the information properly. Although not so illustrated in the drawings, the successful readout of the first block may be indicated by a signal from the receiving terminal device. Such signal may correspond to the previously mentioned Erase 2 signal which is effective to erase the characters of the block previously read out by inhibiting gate 4.

From the previous discussion, it will be understood that the characters of the second block are written into the delay line 5 during first character intervals which alternate with second character intervals during which the readout of the first block characters takes place. Following the erasing of the first block characters, and provided the writing of the second block characters is complete, a transfer signal is generated in the manner previously explained. The latter signal enables the characters of the second block to be read out concurrently with the writing of characters of a third block into the unfilled delay line segments.

From the foregoing disclosure, it will be clear that the invention which forms the subject matter of the present application provides an improved multiple buffer arrangement for transferring information units of variable length from a data generating domain to a data receiving domain, each having its own data rate. The present invention employs a single delay line and provides immediate write access such that it may be directly employed in a real time system.

The principles of the present invetnion are of general applicability and are not limited to a particular delay line, nor to the number of different information blocks which may be simultaneously stored by recirculation in the system. Further, the invention is not restricted to the particular data format chosen. Each received unit of information may constitute a bit, a group of bits, a character, a word, etc.

It will be apparent from the foregoing disclosure of preferred embodiment of the invention that numerous modifications, changes and equivalents will now occur to those skilled in the art, all of which fall within the true spirit and scope contemplated by the invention.

What is claimed is:

1. A system for storing information units comprising: delay line means, means for writing information units into said delay line means, means for reading information units out of said delay line means, means coupled between said writing and readout means to form a closed loop for recirculating said information units, timing means for providing timing signals defining at least first and second alternately occurring time intervals of equal length, the combined delay time of said delay line means and said recirculating means constituting a multiple of the number of said alternately occurring time intervals, write gating means coupled to said writing means and including a first input connected to receive externally derived information units, read gating means including a first input coupled to said readout means, said timing means being coupled to a second input of each of said write and read gating means respectively, said write gating means being responsive to said timing signals to transfer said externally derived units of information to said input means only during said first time intervals, said read gating means being responsive to said timing signals to transfer out information received from said readout means only during said second time intervals, and means for applying a control signal to said timing means, said timing means being responsive to said control signal to modify said timing signals so as to reverse the occurrence in time of said first and second time intervals.

2. A buffer storage system comprising a delay line having an input and an output, means coupled to said input for writing sub-units of at least first and second information units respectively into said delay line, means coupled to said output of said delay line for sampling said information sub-units, bistable circuit means, a pulse source coupled to said bistable circuit means operative to cause the complementing of the latter at predetermined time intervals to provide first and second complementary output signals, said first and second complementary output signals defining first and second alternately occurring time intervals, said delay line forming a closed path with said writing and sampling means adapted to recirculate stored sub-units in constant relationship with respect to said first and second time intervals; said writing means being connected to be responsive to said complementary output signals for writing sub-units of said first information unit into said delay line only during said first time intervals, said writing means including write control means for generating a transfer signal in response to a predetermined condition, means for coupling said transfer signal to said bistable circuit means to inhibit the complementing of the latter so as to produce a reversal in the time of occurrence of said first and second time intervals, said writing means being responsive to said complementary output signals to write sub-units of said second information unit into said delay line between said sub-units of said first information unit only during reversed first time intervals, said sampling means being connected to be responsive to said complementary output signals so as to read out said sub-units of said first information unit only during reversed second time intervals, said sampling means being responsive to said complementary output signals, following another reversal of said time intervals subsequent to the completion of readout of said first information unit, to read out sub-units of said second information unit only during second time intervals.

3. The apparatus of claim 2 wherein said pulse source includes counter means connected to provide successive timing pulses defining time periods of equal duration within each of said time intervals, said bistable means coupled to said counter means and being connected to complement upon each occurrence of a predetermined count of counter means.

4. The apparatus of claim 3 wherein each of said sub-units constitutes an information character characterized by a predetermined number of externally derived data bits and further including first and second internally derived marker bits, said write control means including means responsive to the presence of an external character adapted to generate a write signal in time coincidence with said first complementary signal, said write control means further including means responsive to the presence of the first external character in each of said information units to provide a first character control signal, marker control means coupled to said writing means and to said last recited means and being responsive to the joint occurrence of said write signal and the first timing pulse of a first time interval to write said first marker bit of a character into said delay line through said writing means, said marker control means being further responsive to the joint occurrence of said first character control signal and the second timing pulse of said first time interval to write said second marker bit of said character into said delay line through said writing means, said writing means further including means responsive to said write signal to effect the writing of successive data bits of said character into said delay line in synchronism with the remaining timing pulses in said first time interval.

5. The apparatus of claim 4 wherein said sampling means include a pair of single bit storage elements serially connected in said closed path to delay information recirculating therein by two time periods, said marker control means including means coupled to one of said elements for receiving the first marker bit of successive characters of the same information unit, said writing means including means coupled to said marker control means for comparing successive ones of said first marker bits, and means responsive to a difference of said compared first marker bits for rendering said write signal generating means effective.

6. The apparatus of claim 3 wherein each of said sub-units constitutes an information character each including first and second marker bits succeeded by a plurality of data bits, said sampling means including a first single bit storage element in said closed path, a second single bit storage element in said path connected in series between the output of said delay line and the input of said first storage elements, read control means coupled to said storage elements and to said bistable circuit means, said read control means including means responsive to identical contents of said first and second storage elements, representative of identical first and second marker bits respectively of a character, to generate a read signal during a second time interval, said sampling means including means coupled to the output of said first storage element and controlled by said pulse source to read out the data bits of said last-recited character in the presence of said read signal.

7. The apparatus of claim 6 and further including gating means connected between the output of said first storage element and said writing means, marker control means coupled to said gating means and being responsive to predetermined ones of said timing pulses to activate said gating means in the persence of said read signal, said activation of said gating means being adapted to modify the marker bit format of a character to be read out by inhibiting recirculation around said closed path, said read control means further including means responsive to said read signal for initiating a re-initialize signal, means responsive to the marker bit contents of said storage elements during a subsequent second time interval to activate said storage elements in the presence of said re-initialize signal, said last-recited activation being adapted to modify the existing marker bit format of the subsequent character to be read out, said read control means further including means for terminating said re-initialize signal during said subsequent second time interval following the modification of the marker bit format of said last-recited character.

8. The apparatus of claim 2 and further including erasing means, said erasing means being connected to receive said first and second complementary output signals, means for selectively applying first and second control signals to said erasing means, said erasing means being adapted to generate first or second output signals upon the joint occurrence of separate ones of said control signals with said first or second complementary output signals respectively, gating means connected between said sampling means and said writing means, said gating means being responsive to each of said output signals to inhibit the recirculation of the sub-units of a different one of said units.

References Cited

UNITED STATES PATENTS

| | | | |
|---|---|---|---|
| 3,107,344 | 10/1963 | Baker et al. | 340—173 |
| 3,223,981 | 12/1965 | Fischer | 340—172.5 |
| 3,257,645 | 6/1966 | Lekven | 340—172.5 |
| 3,340,514 | 9/1967 | Swift | 340—172.5 |

PAUL J. HENON, *Primary Examiner.*

R. B. ZACHE, *Assistant Examiner.*